A. O. BENECKE.
ELECTRICAL MEASURING INSTRUMENT.
APPLICATION FILED FEB. 14, 1912.

1,165,745.

Patented Dec. 28, 1915.
4 SHEETS—SHEET 1.

A. O. BENECKE.
ELECTRICAL MEASURING INSTRUMENT.
APPLICATION FILED FEB. 14, 1912.

1,165,745.

Patented Dec. 28, 1915.
4 SHEETS—SHEET 2.

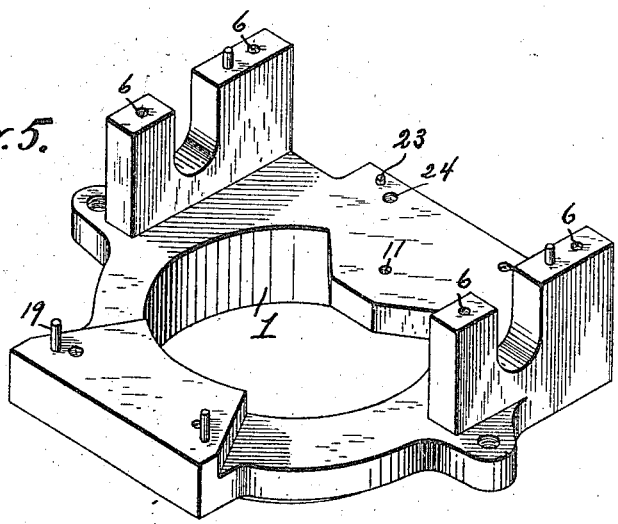
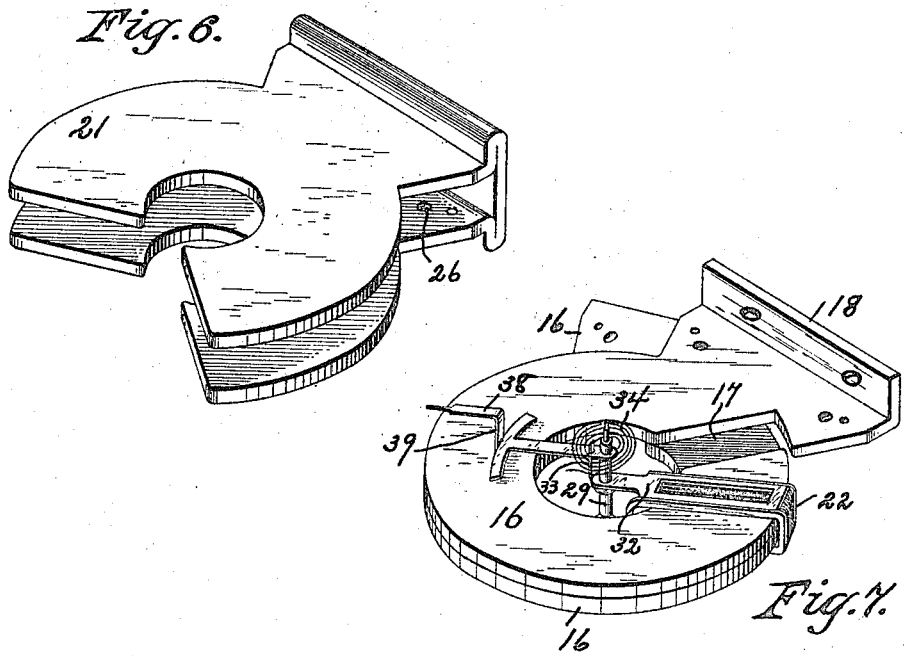

A. O. BENECKE.
ELECTRICAL MEASURING INSTRUMENT.
APPLICATION FILED FEB. 14, 1912.

1,165,745.

Patented Dec. 28, 1915.
4 SHEETS—SHEET 4.

Witnesses:

Inventor
Adelbert O. Benecke
By his Attorney
Frank C. Fischer.

UNITED STATES PATENT OFFICE.

ADELBERT O. BENECKE, OF FOXBORO, MASSACHUSETTS.

ELECTRICAL MEASURING INSTRUMENT.

1,165,745.   Specification of Letters Patent.   Patented Dec. 28, 1915.

Application filed February 14, 1912. Serial No. 677,488.

*To all whom it may concern:*

Be it known that I, ADELBERT O. BENECKE, a citizen of the United States, residing at Foxboro, in the county of Norfolk and State of Massachusetts, have invented certain new and useful Improvements in Electrical Measuring Instruments, of which the following is a full, clear, and exact description, such as will enable others skilled in the art to which it pertains to make, construct, and use the same, reference being had to the accompanying drawings, and to letters of reference marked thereon, forming a part of this specification.

My present invention has reference to improvements in electrical measuring instruments, and the invention relates more particularly to that class of instruments known as the "permanent magnet-moving coil" type.

This invention has for its primary object, to provide such instruments with a field which is uniform over a large angle of deflection (240°), and to further provide a neat, inexpensive, and simply constructed instrument of a strong and durable construction, in which the number of parts have been reduced to a minimum, and in which all of said essential parts are mounted upon one and carried by the same support, thereby obviating any danger of the operative parts of the instrument becoming disarranged, and rendered inoperative through careless handling or assembling of the same.

The invention therefore consists in the novel construction of an electrical measuring instrument to be hereinafter more fully described; and, furthermore, this invention consists in the several novel arrangements and combinations of the parts of the instrument and the details of construction thereof, all of which will be more fully set forth in the following specification, and then finally embodied in the clauses of the claim.

The invention is clearly illustrated in the accompanying drawings, in which—

Figure 1:
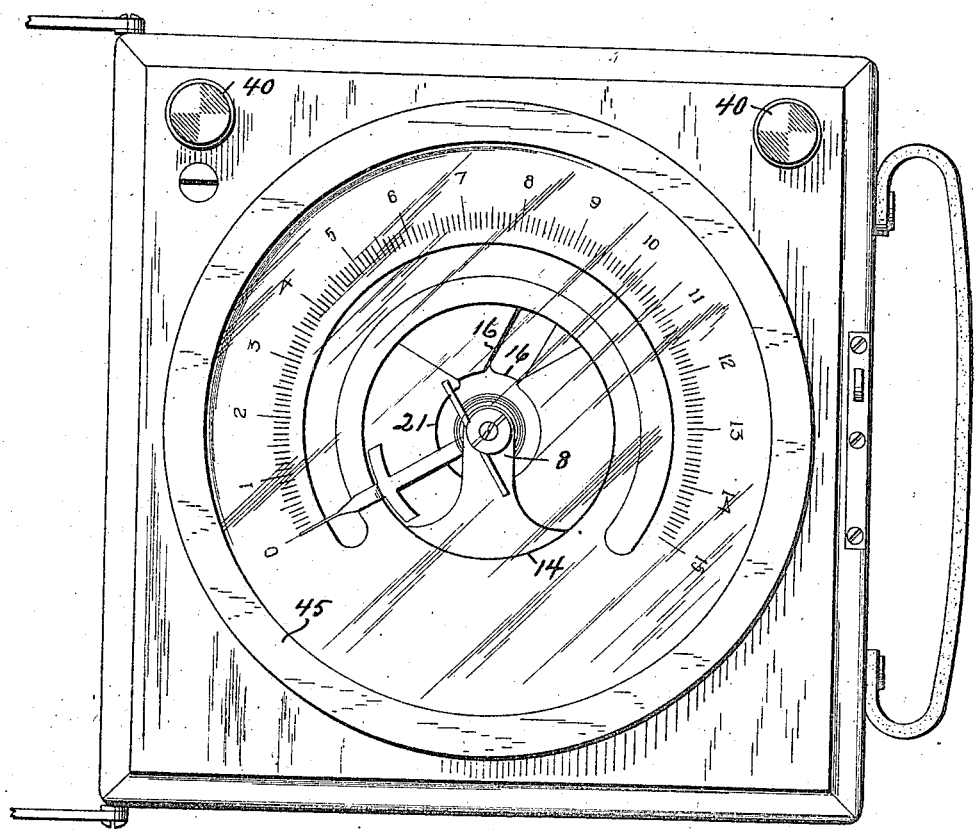
Figure 2:
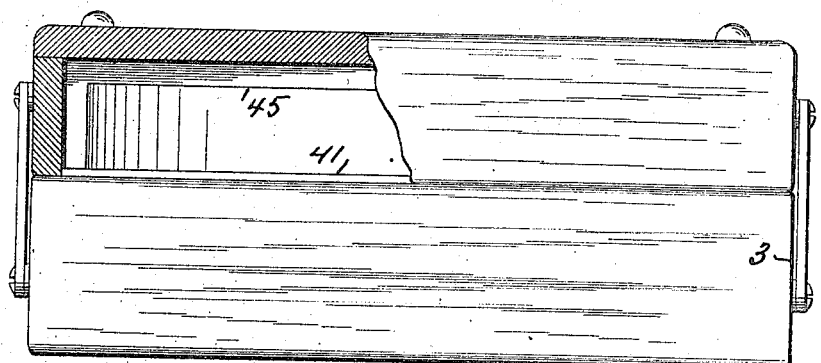
Figure 3:
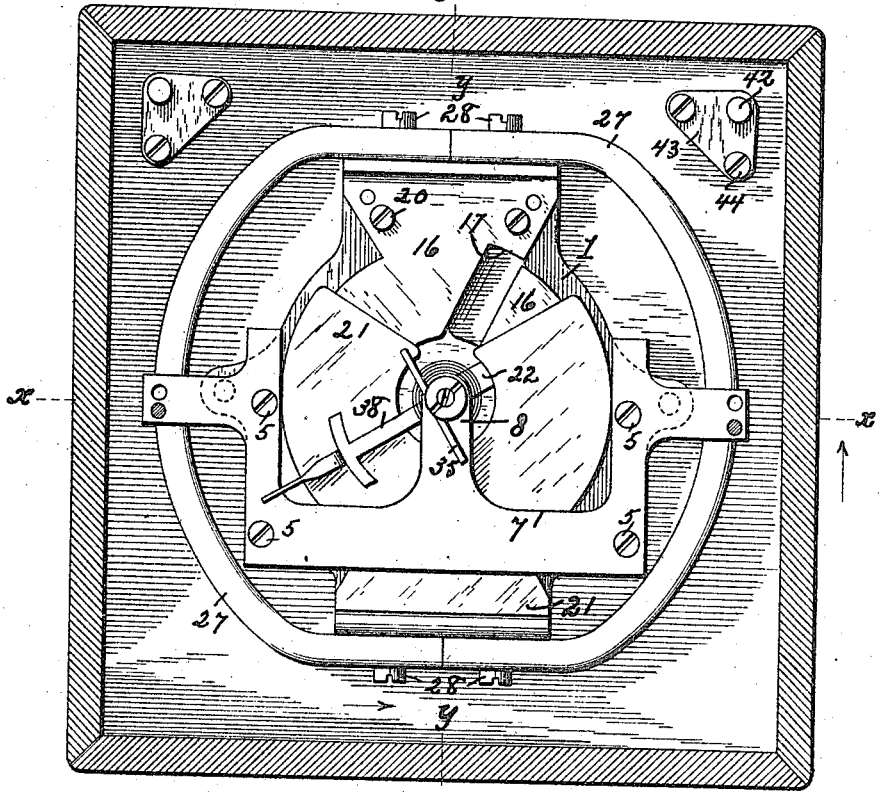
Figure 4:
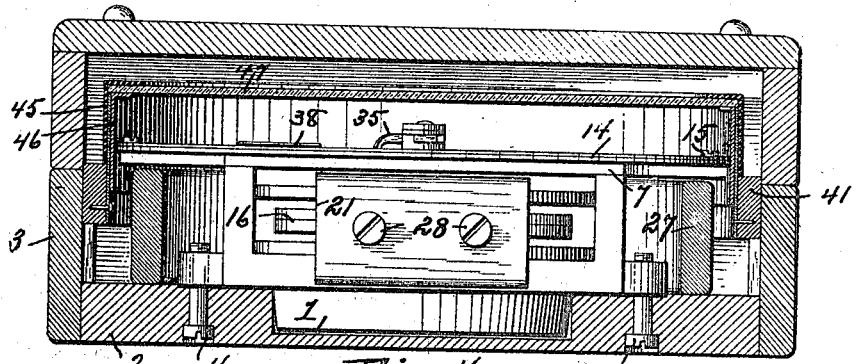
Figure 8:
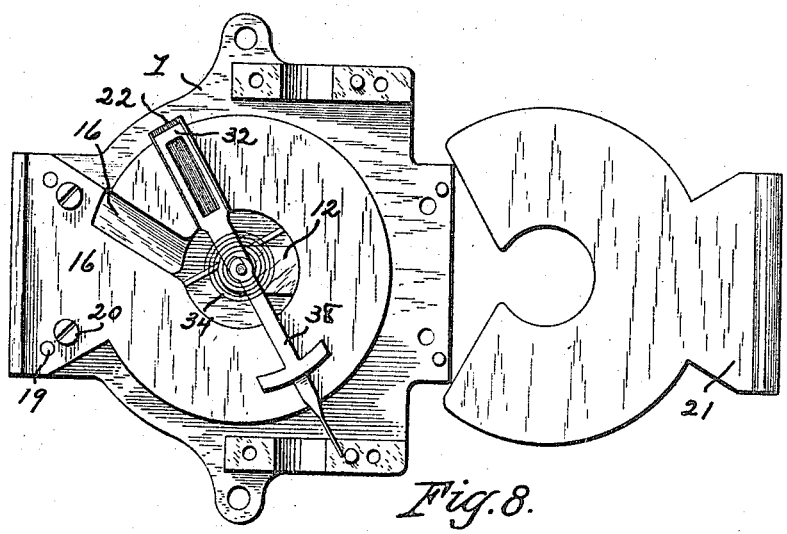
Figure 9:
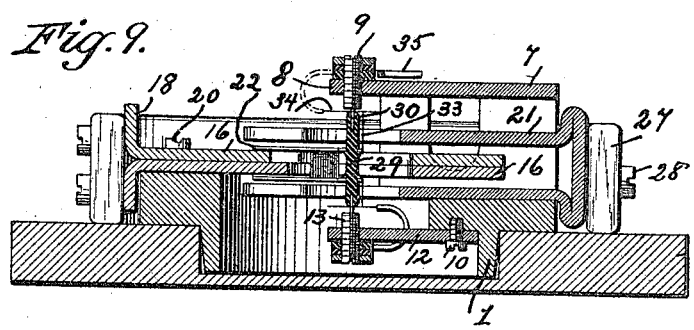
Figure 10:
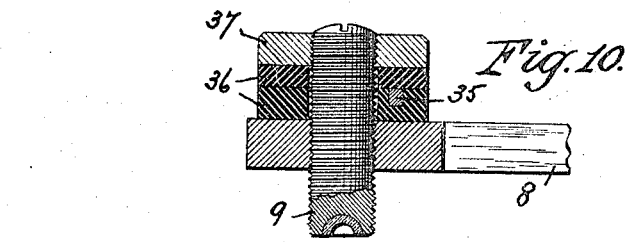

Figure 1 represents a plan view of my said measuring instrument with the cover removed. Fig. 2 represents a side elevation of the same, with a portion of the cover broken away. Fig. 3 represents a sectional plan view of my said measuring instrument, showing the carrying case in section, and the scale plate removed. Fig. 4 represents a section taken on lines $x-x$ of Fig. 3, looking in the direction indicated by the arrow. Fig. 5 represents a perspective view of the supporting base, upon which are mounted all of the essential parts of the instrument. Fig. 6 represents a similar view of the outside pole piece used in connection with my instrument. Fig. 7 represents a similar view of the inside pole piece illustrating the movable coil and its attached pointer. Fig. 8 represents a plan view of the supporting base, having secured thereto, the inside pole piece, the lower bridge, supporting the movable coil with its attached pointer, and further representing the outside pole piece preparatory to being placed in its position on said supporting base. Fig. 9 represents a section taken on lines $y-y$ of Fig. 3, with the carrying case removed, looking in the direction indicated by the arrow; and Fig. 10 represents an enlarged section of the bridge carrying the jewel screw, jewel nut, and the abutment, and illustrating the manner in which the abutment is secured thereto.

Similar reference numerals are employed in all of the above described views, to indicate corresponding parts.

In the drawings, 1 represents the supporting bracket, preferably a die casting made of any suitable non-magnetic material, upon which are mounted all of the essential parts of the instrument, said bracket being secured to the bottom board 2 of the carrying case 3 in any convenient manner, as by means of screws 4. Secured to the top of the uprights which form an integral part of said bracket 1, in any convenient manner, preferably by means of the screws 5, which have screw-threaded engagement with the holes 6, is the combined bridge and scale supporting bracket 7, said bracket 7 being further provided with a centrally-arranged and outwardly projecting integral extension 8, said extension being screw-threaded for the reception of the jewel screw 9. Secured to the under side of the bracket 1 by means of a screw 10 (see Fig. 9) which has screw-threaded engagement with the hole 11 and dowel pins (not shown) is the bottom bridge 12, the outer end of which is provided with a screw-threaded hole for the reception of the jewel screw 13. A circular scale plate 14, provided with a suitable scale, is secured to the combined bridge and scale supporting bracket by means of screws 15.

16 represents the inside pole piece, said pole piece comprising two substantially similar members, each member provided with a slot 17 of sufficient width for the reception of the moving coil to be hereinafter described, and a rectangular integral extension 18. The purpose of forming the slot or opening 17 in the pole piece 16 is to provide a convenient means whereby said coil can be conveniently slipped over one and then over the other member, which together form said pole piece 16, thus providing ready means for the coil's free insertion. These members 16, when assembled, are laid back to back, with the slot 17 so arranged that when so backed, the slot of one member will be over-bridged or covered by the solid stock of the other member, thus providing a pole piece having no interruption, and being symmetrical it allows a uniform distribution of the magnetic flux, therefore providing a uniform field in the instrument. The pole piece 16 is secured to the supporting bracket by means of the dowel pins 19 and screws 20.

21 represents the outside pole piece, preferably struck-up substantially as shown from a single piece of material, between the upper and lower members of which the correspondingly-shaped members of the inside pole piece 16 are inserted, thereby providing a space between the inside and outside pole pieces for the movable coil 22. The outside pole piece 21 is secured to the opposite side of the supporting bracket 1, to which the inside pole piece is also secured, and firmly held in position by means of dowel pins 23 and screws (not shown), which pass through holes 24 in the bracket, and which have screw-threaded engagement with the holes 26 in the pole piece. The manner in which the outside pole piece 21 is located with reference to the inside pole piece 16, which carries the movable coil and pointer, is clearly illustrated in Figs. 8 and 9 of the drawings.

27 represents permanent magnets secured to the inside and outside pole pieces 16 and 21 by means of screws 28, as clearly indicated in Figs. 3, 4 and 9 of the drawings.

It will be seen from an inspection of Figs. 3, 8 and 9 of the drawings, that the inside diameter of the pole piece 21 is somewhat smaller than the inside diameter of the pole piece 16, and that the outside diameter of the pole piece 21 is somewhat larger than the outside diameter of the pole piece 16, thus enabling every particle of wire contained on the movable coil 22 to be active. The movable coil 22 encircles the inside pole piece and is free to move on the pivots 30 in the space between the inside and the outside pole pieces, namely, in the field of the magnet. This construction enables me to obtain a field which is uniform over a large angle of deflection approximately upward of 240 degrees. Said coil is of ordinary construction and common in instruments of this type. A central stud or shaft 29 preferably made of bone, or other insulating material, is provided with upper and lower steel pivots 30 secured thereto in any convenient manner, by means of which the said coil and its attached pointer is free to move on said pivots in the field of the magnet. Two supporting plates 32 are carried by said central stud 29, between which the said coil 22 with its winding is cemented or otherwise secured. The ends of the winding are soldered to the plates 32, which are insulated from each other by the bone shaft 29.

The supporting plates 32 are further provided with a rectangular extension 33 to the ends of which the inner ends of the two spiral springs 34 are secured, preferably by means of solder. The outer ends of the said springs 34 are soldered or otherwise secured to the stationary abutments 35 which are adjustably mounted upon the top and bottom bridges 8 and 12 respectively, and insulated therefrom. These abutments are preferably clamped between two washers 36 of insulating material, said washers surrounding the jewel screws 9 and 13, and being clamped in position by means of the jewel nuts 37. A pointer 38 of any convenient form provided with an offset 39, is secured to the pivot-carrying shaft 29 in any well-known manner, and designed to pass through a suitable aperture in the scale plate 14 and over a suitable scale, conveniently mounted upon said scale plate 14.

40 represents binding posts located on the top board 41 of the instrument, the binding screws 42 of which are secured to plates 43, fastened in any convenient manner to the bottom board 2 as by means of screws 44. The circuit in the instrument proceeds from one binding post 40 on the top board 41 to one of the abutments 35 on one of the bridges, through one of the spirals 34 to the end 33 of one of the supporting plates 32, through the coil 22, through the other end of the supporting plate 32, spiral 34, abutment 35 and binding post 40. To the top board 41, I secure in any convenient manner, a circular cover 45, preferably made of fiber or other suitable insulating material, and secured thereto by means of an inner annular rim 46 a glass front 47.

Experience has demonstrated that the organization above described is a highly efficient one, inasmuch as all of the essential parts of the instrument are mounted upon and carried by the supporting bracket 1, thereby obviating any danger of the operative parts of the instrument becoming disarranged and rendered inoperative through careless handling or assembling of the same. Furthermore, the construction and arrangement of the pole pieces are such that when the moving coil is moving in the field of the magnet, every particle of wire contained on the movable coil is active, thereby enabling me to obtain a field which is uniform over a large angle of deflection, of approximating 240°. The invention is not limited to the exact embodiment shown, but may be modified in various ways in the scope of the following claims:

I claim:

1. In an electrical measuring instrument, provided with an inside and outside pole piece, each pole piece provided with inner and outer circumferential edges, the inner and outer circumferential edges of the outside pole piece extending beyond the inner and outer circumferential edges of the inside pole piece, a movable coil, the inside pole piece comprising two substantially similar members, each member being provided with an opening for permitting the free insertion of said movable coil, said members being secured together so that the opening of one member will be over-bridged by the solid stock of the other member, said inside pole piece being inserted in the outside pole piece, thereby providing a space between the inside and outside pole pieces for the movable coil, thus permitting a uniform distribution of the magnetic flux, thereby rendering the field of the instrument uniform over a wide angle of deflection.

2. In an electrical measuring instrument, provided with an inside and outside pole piece, each pole piece provided with inner and outer circumferential edges, the inner and outer circumferential edges of the outside pole piece extending beyond the inner and outer circumferential edges of the inside pole piece, a movable coil, the inside pole piece comprising two substantially similar members, each member being provided with an opening for permitting the free insertion of said movable coil, said members being secured together so that the opening of one member will be over-bridged by the solid stock of the other member, said inside pole piece being inserted in the outside pole piece, thereby providing a space between the inside and outside pole pieces for the movable coil, thus permitting a uniform distribution of the magnetic flux, thereby rendering the field of the instrument uniform over a wide angle of deflection, upper and lower bridges for supporting the movable coil and a supporting bracket adapted to support and firmly secure all of said parts together.

3. In an electrical measuring instrument, the combination of a pair of magnets, an inner and outer pole piece secured to said magnets, a supporting bracket to which said pole pieces are secured, a movable coil, upper and lower bridges secured to said supporting bracket for supporting said coil, and a scale plate carried by said supporting bracket, said supporting bracket being provided with integral supports designed to support and firmly secure all of said parts together.

4. In an electrical measuring instrument, the combination of a pair of magnets, an inside and outside pole piece secured to said magnets, a movable coil, the inside pole piece comprising two substantially similar members, each member being provided with an opening for permitting the free insertion of said movable coil, said members being secured together so that the opening of one member will be over-bridged by the solid stock of the other member, said inside pole piece being inserted in the outside pole piece, thereby providing a space between the inside and outside pole pieces for the movable coil, thus permitting a uniform distribution of the magnetic flux, thereby rendering the field of the instrument uniform over a wide angle of deflection, a supporting bracket to which said pole pieces are secured, upper and lower bridges secured to said supporting bracket for supporting said coil, and a scale plate carried by said supporting bracket, said supporting bracket designed to support and firmly secure all of said parts together.

5. In an electrical measuring instrument, provided with an inside and outside pole piece, the inner and outer circumferential edges of the outside pole piece extending beyond the inner and outer circumferential edges of the inside pole piece, a movable coil encircling the inside pole piece, and so arranged that the inner and outer circumferential edges of the outside pole piece overlap and extend beyond the said coil, the inside pole piece comprising two substantially similar members, each member being provided with an opening for permitting the free insertion of said movable coil, said members being secured together so that the opening of one membr will be over-bridged by the solid stock of the other member, said inside pole piece being inserted in the outside pole piece, thereby providing a space between the inside and outside pole pieces for the movable coil, thus permitting a uniform distribution of the magnetic flux, thereby rendering the field of the instrument uniform over a wide angle of deflection.

6. In an electrical measuring instrument, the combination of a pair of magnets, an inside and outside pole piece secured to said magnets, a movable coil, the inside pole piece comprising two substantially similar members, each member being provided with an opening for permitting the free insertion of said movable coil, said members being secured together so that the opening of one member will be over-bridged by the solid stock of the other member, said inside pole piece being inserted in the outside pole piece, thereby providing a space between the inside and outside pole pieces for the movable coil, thus permitting a uniform distribution of the magnetic flux, thereby rendering the field of the instrument uniform over a wide angle of deflection, a supporting bracket to which said pole pieces are secured, supporting plates secured to and extending beyond said coil, a stud or shaft passing through said extended portions of the supporting plates, pivot pins secured in the opposite ends of said stud or shaft, upper and lower bridges secured to said supporting bracket for supporting said coil, and a scale plate carried by said supporting bracket, said supporting bracket designed to support and firmly secure all of said parts together.

7. In an electrical measuring instrument, the combination of a pair of magnets, an inside and outside pole piece secured to said magnets, the inside pole piece comprising two substantially similar members, each member being provided with an opening for permitting the free insertion of said movable coil, said members being secured together so that the opening of one member will be over-bridged by the solid stock of the other member, said inside pole piece being inserted in the outside pole piece, thereby providing a space between the inside and outside pole pieces for the movable coil, thus permitting a uniform distribution of the magnetic flux, thereby rendering the field of the instrument uniform over a wide angle of deflection, a supporting bracket to which said pole pieces are secured, a movable coil, supporting plates secured to and extending beyond said coil, a stud or shaft passing through said extending portions of the supporting plates, said extended portions of the supporting plates being further provided with rectangular extensions for the purpose of securing spiral conducting springs to said extensions, pivot pins secured in the ends of said stud or shaft, upper and lower bridges secured to said supporting bracket for supporting said coil, and a scale plate carried by said supporting bracket, said supporting bracket designed to support and firmly secure all of said parts together.

8. In an electrical measuring instrument provided with a movable coil, a pair of magnets, an inside and an outside pole piece, a lower bridge, an upper bridge and scale plate bracket, a scale plate and a supporting bracket provided with integral supports designed to support and firmly secure all of said parts together.

This specification signed and witnessed this ninth day of February, 1912.

ADELBERT O. BENECKE.

Witnesses:
MAX PAUL,
G. W. SAMSON.